United States Patent
Dea et al.

(10) Patent No.: US 7,634,981 B2
(45) Date of Patent: Dec. 22, 2009

(54) VALVE PERFORMING DETECTION AND MODIFICATION STRATEGY FOR INTERNAL COMBUSTION ENGINE

(75) Inventors: Kevin Dea, Washington, IL (US); Daniel R. Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 346 days.

(21) Appl. No.: 11/639,685

(22) Filed: Dec. 15, 2006

(65) Prior Publication Data

US 2008/0141957 A1 Jun. 19, 2008

(51) Int. Cl.
*F01L 1/34* (2006.01)
*F01L 9/00* (2006.01)

(52) U.S. Cl. .............. 123/90.15; 123/90.11; 123/90.12; 73/144.58

(58) Field of Classification Search .............. 123/90.11, 123/90.14, 90.15; 73/114.77, 114.79, 114.58
See application file for complete search history.

(56) References Cited

U.S. PATENT DOCUMENTS

| | | | |
|---|---|---|---|
| 4,875,451 A | 10/1989 | Evasick et al. | |
| 4,941,348 A | 7/1990 | Hock | |
| 5,107,701 A | 4/1992 | Smith | |
| 5,456,223 A * | 10/1995 | Miller et al. .............. | 123/90.12 |
| 5,634,448 A | 6/1997 | Shinogle et al. | |
| 5,746,175 A | 5/1998 | Hu | |
| 5,839,420 A | 11/1998 | Thomas | |
| 5,889,405 A * | 3/1999 | Yanai et al. ................. | 324/522 |
| 6,216,668 B1 | 4/2001 | Haugen | |
| 6,354,266 B1 | 3/2002 | Cornell et al. | |
| 6,363,314 B1 | 3/2002 | Hafner et al. | |
| 6,651,619 B2 * | 11/2003 | Ogiso ..................... | 123/339.11 |
| 6,668,773 B2 * | 12/2003 | Holtman et al. .......... | 123/90.12 |
| 6,748,928 B2 | 6/2004 | Shingole | |
| 6,769,392 B2 | 8/2004 | Lawrence et al. | |
| 6,892,569 B2 | 5/2005 | Martin et al. | |
| 6,986,646 B2 | 1/2006 | Bettenhausen et al. | |
| 2003/0041843 A1 | 3/2003 | Shinogle | |
| 2003/0213449 A1 | 11/2003 | Bloms et al. | |
| 2005/0126524 A1 | 6/2005 | Funke et al. | |
| 2006/0096560 A1 * | 5/2006 | Afjeh et al. ............... | 123/90.11 |

FOREIGN PATENT DOCUMENTS

| | | |
|---|---|---|
| DE | 103 24 806 | 12/2004 |
| EP | 1340888 | 9/2003 |
| JP | 03-182607 * | 8/1991 |

\* cited by examiner

*Primary Examiner*—Michael Cuff
*Assistant Examiner*—Ka Chun Leung
(74) *Attorney, Agent, or Firm*—Liell & McNeil (57) ABSTRACT

A method for operating a multi-cylinder internal combustion engine includes controlling opening of intake or exhaust valves, via a step of generating a control current in a control circuit for an electrical actuator coupled with the valve. The control circuit is then monitored for an induced current that differs from the control current, and a signal outputted that is indicative of valve performance responsive to monitoring the control circuit. Another operating method includes determining engine valve performance and also trimming an engine valve based on one signal which is indicative of valve performance. An internal combustion engine includes an electrical actuator configured to control opening or closing of one of an intake valve and an exhaust valve. An electronic control module is configured via a software fault detection routine to determine a performance condition of an intake or exhaust valve in the engine via monitoring a control circuit for induced currents when an electrical actuator coupled with the intake or exhaust valve is de-energized.

18 Claims, 4 Drawing Sheets

VALVE PERFORMING DETECTION AND MODIFICATION STRATEGY FOR INTERNAL COMBUSTION ENGINE

TECHNICAL FIELD

The present disclosure relates generally to methods and systems for operating engines having valves such as variable intake or exhaust valves, and relates more particularly to an operating method for such a valve where its performance is determined via monitoring induced currents in a control circuit of an electrical actuator coupled therewith.

BACKGROUND

Variably timed intake and exhaust valves are used in a variety of engines, notably compression ignition internal combustion engines. Conventional engine systems typically utilize a rotating cam configured to control opening and/or closing of engine valves at desired times during an engine cycle. Variably timed valves provide some flexibility in opening or closing timing in certain engine systems via actuators configured to control valve position separately from cam rotation. Such systems can thus provide enhanced control over cylinder conditions during an engine cycle, enabling emissions reduction and other strategies such as engine braking. As is well known in the art, the performance characteristics of variable valves can depart from desired specifications under certain conditions.

One known application for variable valve timing relates to holding open intake valves past a time in an engine cycle at which they would normally be permitted to close. In a typical engine cycle, a rotating cam opens an intake valve during at least a portion of an intake stroke in a particular cylinder, then permits the valve to return to a closed position approximately when the corresponding piston reaches a bottom dead center position and begins a compression phase. Variable intake valve actuators may be used to maintain a particular intake valve in an open state, despite the cam ceasing to exert an opening force on the valve.

It is common for variable valves to be actuated via a hydraulic intake valve actuator or piston, separate from the engine cam. As an intake valve moves toward an open position under the influence of a rotating cam, hydraulic fluid is permitted to flow into a control cavity to which a pressure surface of a valve actuator is exposed. A separate control valve may then be used to block fluid draining from the cavity, such that the valve actuator is hydraulically locked to inhibit closing of the intake valve. The intake valve may be held in an open position until such time as the control valve is adjusted to permit draining of fluid from the cavity and consequent returning of the intake valve to a closed position. As alluded to above, however, certain performance characteristics such as the specific timing of valve closing can depart from an optimal timing. Variations in timing can degrade overall engine performance, and emissions quality, and can render certain operating schemes unachievable. In extreme cases, failure of variable valve components can subject the system to potentially damaging cylinder pressures. The control valve responsible for blocking and unblocking fluid draining from the control cavity tends to be a major contributor to valve timing variability and failure in such systems. Evaluation of the performance of individual control valves, however, has heretofore been challenging.

One method of diagnosing problems in an engine having variable valve timing relies upon the use of a pressure sensor coupled with a common rail for supplying actuation fluid to the control cavity of the intake valve actuator. Operation of variable valve actuators in an engine has been shown to be associated with certain changes in pressure in the common rail. Thus, signals from the pressure sensor may be used to indicate changes in rail pressure, or lack of changes, relative to expected changes from variable valve actuator operation. While such systems have performed well over the years, there is room for improvement. Such systems also increase cost and complexity of engine systems.

Another diagnostic strategy for a variable valve mechanism is known from United States Patent Application Publication No. 2005/0126524. In the '524 application, a test strategy is provided wherein misfire is induced in a cylinder of the engine via controlling the state of an engine valve. Proper activation of the valve mechanism may be confirmed by detecting whether a misfire due to keeping the valve open during compression occurs when expected. While the '524 application sets forth one useful strategy, the ability to diagnose valve performance deviations via other means is desirable.

The present disclosure is directed to one or more of the problems or shortcomings set forth above.

SUMMARY OF THE DISCLOSURE

In one aspect, the present disclosure provides a method for operating a multi-cylinder internal combustion engine. The method includes controlling opening or closing of one of intake and exhaust valves associated with each of the cylinders, including generating a control current in a control circuit for an electrical actuator operably coupled with one of the valves. The method further includes monitoring the control circuit for an induced current different from the control current, and outputting a signal indicative of valve performance responsive to monitoring the control circuit.

In another aspect, the present disclosure provides a method of operating a variable valve in an internal combustion engine that includes one of an intake valve and an exhaust valve. The method includes generating a control current in a control circuit for an electrical actuator configured to control one of opening and closing of the variable valve. The method further includes commanding cessation of the control current, monitoring current in the control circuit subsequent to commanding cessation of the control current and indicating a performance condition of the valve responsive to monitoring current in the actuator control circuit.

In another aspect, the present disclosure provides an internal combustion engine including a housing having a plurality of cylinders, intake valves in fluid communication with each of the cylinders and exhaust valves in fluid communication with each of the cylinders. The engine further includes electrical actuators configured to control opening or closing of one of the intake valves and exhaust valves at least in part via energizing and de-energizing of the electrical actuators, the electrical actuators each coupled with a control circuit. The engine still further includes an electronic control module configured to determine a performance condition of each of the valves via monitoring each of the control circuits for induced currents when the corresponding electrical actuators are de-energized.

DETAILED DESCRIPTION

Figure 1:
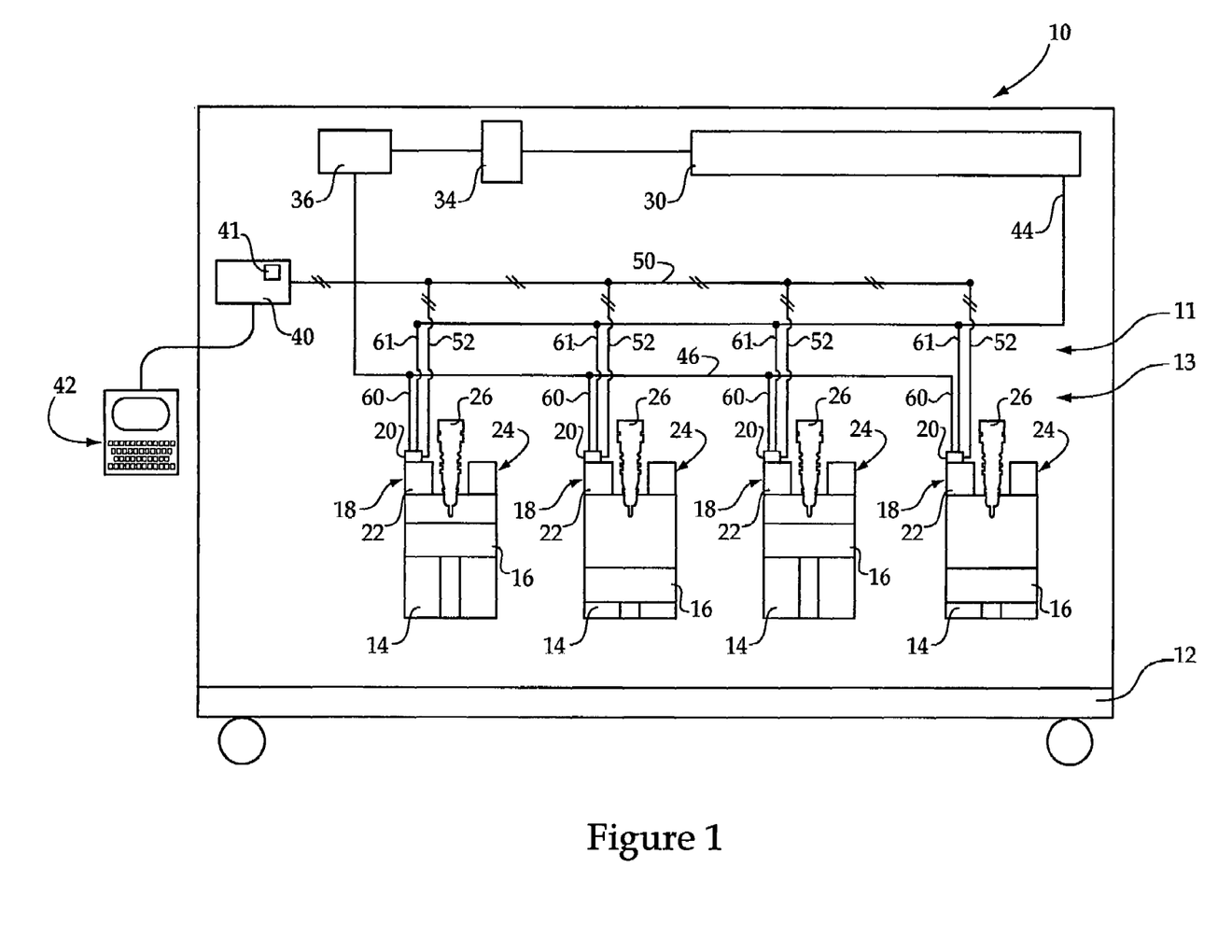
FIG. 1 is a schematic illustration of a machine having an engine according to the present disclosure.

Referring now to FIG. 1, a machine 10 such as an on-road truck or an off-road machine includes an engine system 11 having an engine 13 mounted on a wheeled chassis 12. Engine 13 may comprise a multi-cylinder engine such as a compression ignition diesel engine, but could be any multi-cylinder engine including but not limited to a spark ignition gasoline engine or a gaseous fuel engine. Although it is contemplated that engine system 11 may be used in a variety of mobile machines, the present disclosure is not thereby limited and instead engine system 11 might be used in a stationary machine such as a genset, a compressor, pump, or any of a wide variety of other machines. Engine 13 is illustrated as having four in-line cylinders 14, however, in other embodiments a different number of cylinders or different cylinder configuration might be used. Each of cylinders 14 includes a piston 16 disposed therein, a fuel injector 26, and a variably timed valve apparatus 18 having a valve member 22 and being in fluid communication with the respective cylinder 14. Each of cylinders 14 further includes an associated second valve apparatus 24, which may or may not be variably timed. For reasons which will be apparent from the following description, the present disclosure is considered applicable to any engine system having some electronically controlled variable valve timing capabilities for intake or exhaust valves, wherein an electrical actuator 20 of each valve apparatus 18 is configured to control timing of opening and/or closing of the respective valve apparatus.

In the embodiment of FIG. 1, valve apparatuses 18 may each comprise a variably timed intake valve, configured to open and close in part via rotation of an engine cam, described herein. In other embodiments, however, valve apparatuses 18 might comprise variably timed exhaust valves. Embodiments are also contemplated having both variably timed intake and exhaust valves. In a practical implementation strategy wherein an engine cam is used, each electrical actuator 20 will enable control over intake valve position separately from rotation of the associated cam. To this end, each electrical actuator 20 may be configured to control a hydraulic fluid supply to or from valve apparatus 18.

Engine system 11 may be equipped with a common rail 30 configured to supply hydraulic fluid via fluid passages 44 and 61 to each of valve apparatuses 18. Each electrical actuator 20 may in turn be configured to open and/or close hydraulic fluid supply to each valve apparatus 18, in the manner described herein, to enable selective holding open of the corresponding valve member 22, for example. Fluid draining from valve apparatuses 18 may return to a fluid tank 36 via a drain passage 46, and may thenceforth be re-supplied to common rail 30 via a hydraulic pump 34 in a conventional manner. In other embodiments, a design other than a common rail system might be used.

Electrical actuators 20 may be coupled with an electronic control module 40 including or coupled with at least one electro-motive sensor 41. In particular, each electrical actuator 20 may be coupled with a control circuit 52 that connects via control line(s) 50 to enable selective energizing and de-energizing of each of the corresponding electrical actuators 20 via control commands from electronic control module 40. The at least one electro-motive sensor 41 could comprise a plurality of electro-motive sensors coupled one with each of control circuits 52, and in communication with electronic control module 40. Energizing and de-energizing of actuators 20 may be used to control the closing timing of valve apparatuses 18 in a manner familiar to those skilled in the art, for example via blocking draining of hydraulic fluid from a control cavity associated one with each valve apparatuses 18, as described herein. Electronic control module 40 may consist of an engine controller or a different controller, configured via a software control routine to diagnose and/or trim individual cylinders 14 to both detect and ameliorate deviations in performance of valve apparatuses 18 from a desired performance, for example deviations in valve timing. Electronic control module 40 may also be configured to couple with a service tool 42 that performs the diagnostic procedures and cylinder trimming described herein. Thus, while electronic control module 40 may perform the diagnostics and/or trimming procedures on-board, an external computer such as service tool 42 might be plugged into engine system 11 to carry out a similar role at a service station, and might include the one or more electro-motive sensors 41 described herein. Thus, references herein to electronic control module 40 performing some particular function should not be construed as limiting the present disclosure to the use of an on-board computer.

Figure 2:
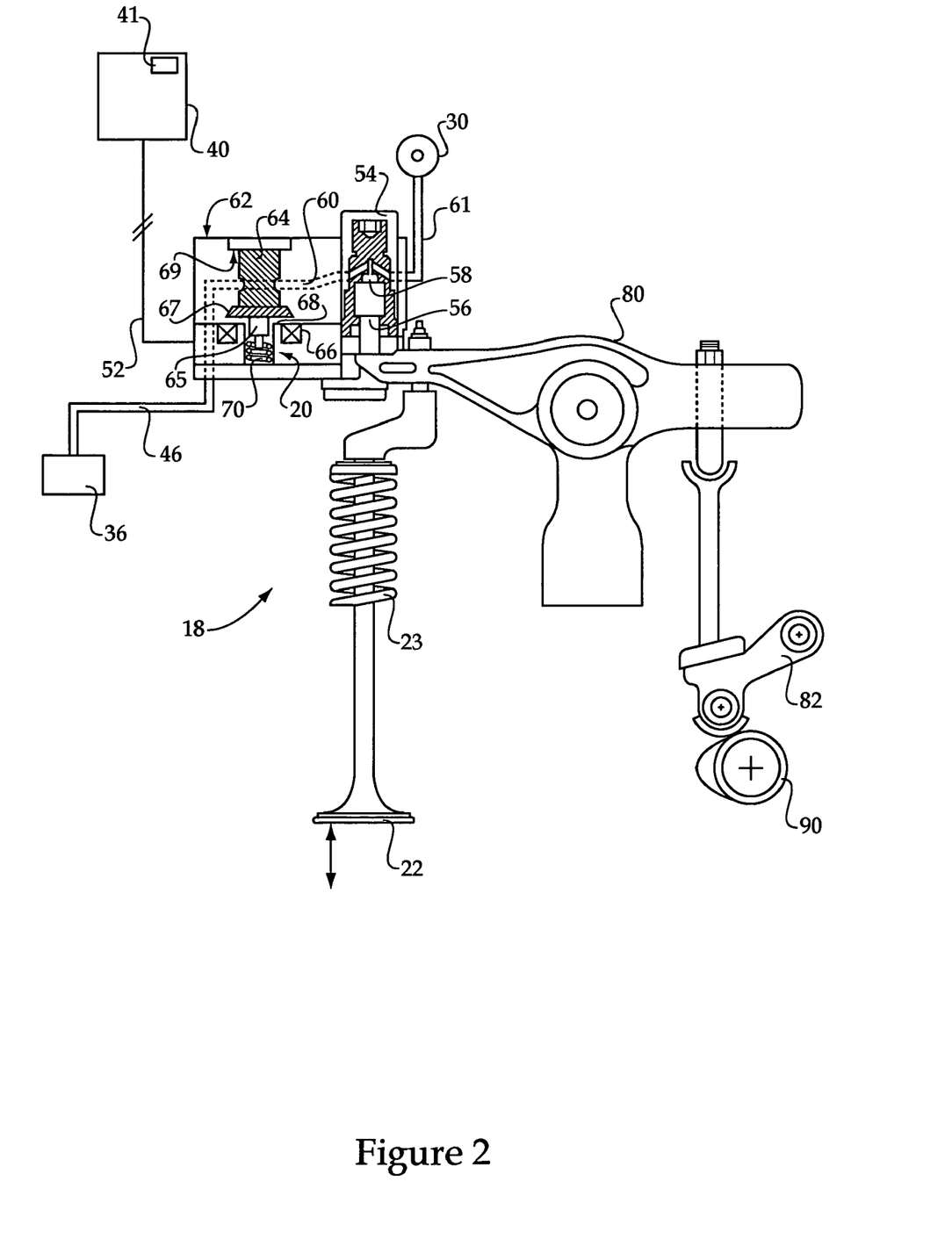
FIG. 2 is a partially sectioned side view of a variable valve apparatus according to the present disclosure.

Turning now to FIG. 2, there is shown one of valve apparatuses 18 in more detail. Each of valve apparatuses 18 may be similar or identical to that shown in FIG. 2, and therefore discussion of the apparatus 18 of FIG. 2 should be understood as referring to each of valve apparatuses 18. In the illustrated embodiment, valve member 22 may be coupled with a rocker arm 80, which is in turn tilted in a generally back and forth manner via rotation of an engine cam 90. To this end, a cam follower 82 is provided which is coupled with rocker arm 80, and alternately tilts rocker arm 80 back and forth as rotating cam 90 engages therewith. A return spring 23 may be coupled with valve member 22 and configured to bias valve member 22 toward a closed position, upwardly in FIG. 2, such that when rocker arm 80 tilts/rotates in a clockwise direction, valve 22 may move toward a closed position under the influence of spring 23, and when rocker arm 80 tilts/rotates in a counter-clockwise direction, valve member 22 may move toward an open position.

A control valve 62 employing actuator 20 may be used to depart from the cam and spring-dictated opening and closing timing of valve apparatus 18. To this end, a variable valve actuator piston 56 may be provided which is configured to move within a housing 54 along with rocker arm 80 during opening of valve apparatus 18. In other words, when rocker arm 80 is actuated via cam 90 to move valve member 22 toward an open position, a down direction in FIG. 2, member 56 will move downwardly, and permit hydraulic fluid from common rail 30 to flow into a cavity or chamber 58 via an inlet passage 61. Fluid pressure in chamber 58 acts on exposed control surface(s) of piston 56 which, if maintained as described herein, will inhibit returning of rocker arm 80 and valve member 22 towards a position at which valve apparatus 18 is closed. While the illustrated embodiment of FIG. 2 represents one practical implementation strategy, those skilled in the art will appreciate that a wide variety of variable valve actuation mechanisms could be used. For instance, piston 56 could act on a different part of rocker arm 80 or directly on valve member 22. Further, the configuration, orientation and functionality of piston 56 and/or housing 54 could be different than that pictured in FIG. 2. The present disclosure contemplates any suitable means within the context of an internal combustion engine for varying opening and/or closing timing of valve apparatus 18 which relies at least in part upon activation of an electrical actuator, as further described herein.

Blocking draining of hydraulic fluid from chamber 58 to maintain valve apparatus 18 in an open position may be achieved via a control valve member 64, configured to block a fluid drain passage 60 connecting with chamber 58. Valve member 64 may comprise a normally open control valve member, approximately as shown in FIG. 2, movable to selectively block passage 60. Control over valve member 64 is achieved via energizing and de-energizing a solenoid 66, to move valve member 64 between a first seat 69 and a second seat 68 via moving an armature 67 coupled with valve member 64. Valve member 64 may be biased against first seat 69 via a biasing spring 70 such that fluid can freely drain from chamber 58 via passage 60 so long as solenoid 66 is de-energized. When solenoid 66 is energized, valve member 64 will be induced to move toward seat 68 whereat fluid is prevented from draining from chamber 58. By energizing and de-energizing solenoid 66, passage 60 may be alternately blocked and opened, such that member 56 can be hydraulically locked to hold open valve apparatus 18 as desired. An electromagnetic interaction between a portion of valve member 64 and solenoid 66 may be used in determining a timing at which valve member 64 returns to seat 69 when de-energized, the significance of which will be apparent from the following description.

By monitoring appropriate parameters, the present disclosure provides an engine operating method and, in particular a valve operating method, whereby variable valve performance and, hence, the performance of a specific cylinder 14 of engine 13 can be evaluated. In contrast to certain earlier strategies, the failure mode, specific valve apparatus 18, and associated cylinder 14 responsible for variations in performance can be identified. The engine and/or valve operating methods may be purely a diagnostic strategy, but may also include measures for adjusting valve performance once a problem has been identified. It has been discovered that an electromagnetic interaction between a pin 65 of valve member 64 and solenoid 66 may be leveraged to detect and modify valve performance. In particular, as pin 65 moves through solenoid 66, it may induce a current in solenoid 66 and control circuit 52, connected with solenoid 66. Electro-motive sensor 41 may be used to detect the induced current, known as a "free-wheel pulse" or "back EMF," which will typically be sensed when a control current for energizing solenoid 66 is not present in control circuit 52. Thus, the engine and valve operating strategies described herein may include generating control currents in control circuits 52 associated with each of valve apparatuses 18, for example by outputting control current commands to energize actuators 20. The generated control current will result in moving a valve member 64 of each valve apparatus 18 toward a seat 68. The operating strategies of the present disclosure may further include commanding deactivating of actuators 20, i.e. commanding cessation of the control currents, resulting in permitting returning of each valve member 64 toward its corresponding seat 69 via the respective spring 70. While the valve member 64 of each apparatus 18 is returning toward its seat, the appropriate control circuit 52 is monitored for induced currents, different from the commanded control currents, as pin 65 moves through solenoid 66. Similar component and operating arrangements for each of valve apparatuses 18 in engine system 11 will enable a diagnostic routine in engine system 11 whereby status of each of valve apparatuses 18 and their associated cylinders 14 may be determined, as further described herein.

The presence or absence of an induced current in each control circuit 52 can indicate problems attendant to operation of the electrical actuator 20 coupled therewith. In particular, if no induced current is detected it may be determined in at least some instances that the corresponding valve member 64 is stuck against one of, or between, seats 68 and 69 and, hence, unable to interact with solenoid 66 to induce a current therein. In such cases, the particular valve apparatus 18 may have a fault condition, and its associated cylinder 14 may thus be understood as also having a fault condition. In one embodiment, satisfaction of fault criteria may include several successive determinations of the absence of an induced current, or differences between induced current and an expected current. Hence, a fault condition may not be triggered until a failure to detect an expected current occurs for two or more, for example three, successive attempts at holding open the corresponding valve apparatus 18 during a piston compression stroke in an engine cycle. Each time the absence of an induced current, or an aberration in induced current, is detected for a particular cylinder, a corresponding signal may be recorded in an electronically accessible storage medium such that when a threshold number of such signals are recorded, it may be indicated to a computer or technician that the cylinder/valve needs adjustment, maintenance, replacement, etc. Once the threshold number of signals indicating problems with a particular valve/cylinder for one or more of cylinders 14 is reached, a trimming routine may be initiated.

A further characteristic of induced currents in control circuits 52 which may be used in determining and in particular modifying valve performance relates to the timing of a peak in an induced current pulse. In other words, even where an induced current is detected, the timing of the peak in the induced current pulse can provide data regarding valve performance that can be useful as described herein, in particular in trimming cylinders 14. Because pulse peak timing relates to control valve position, which in turn relates to intake valve closing timing in the present embodiment, the pulse peak timing can be monitored and used to indicate valve performance, and provide a means for modifying the same. When solenoid 66 is de-energized, valve member 64 will begin to move under the force of spring 70 from a stationary position. Valve member 64 will generally tend to accelerate as it continues to move toward seat 69, typically having a maximum velocity at the point in time at which it hits seat 69. This maximum velocity generally corresponds to a maximum electro-magnetic interaction between valve member 64 and solenoid 66, and hence a pulse peak of current induced in circuit 52. Because pulse peak timing has been demonstrated to be associated with a closing timing of valve apparatus 18, where pulse peak timing is different from an expected timing, a fault condition may be present. Thus, the present control strategies may include comparing monitored pulse peak timing with an expected timing, and indicating a performance condition of the corresponding valve apparatus 18, and its associated cylinder 14. A signal indicative of the performance status may be generated via electronic control module 40, or service tool 42, responsive to comparing the monitored pulse peak timing with expected timing. A threshold number of measurements may be used, similar to the presence/absence of an induced current described above, to satisfy fault criteria if desired.

Figure 3:
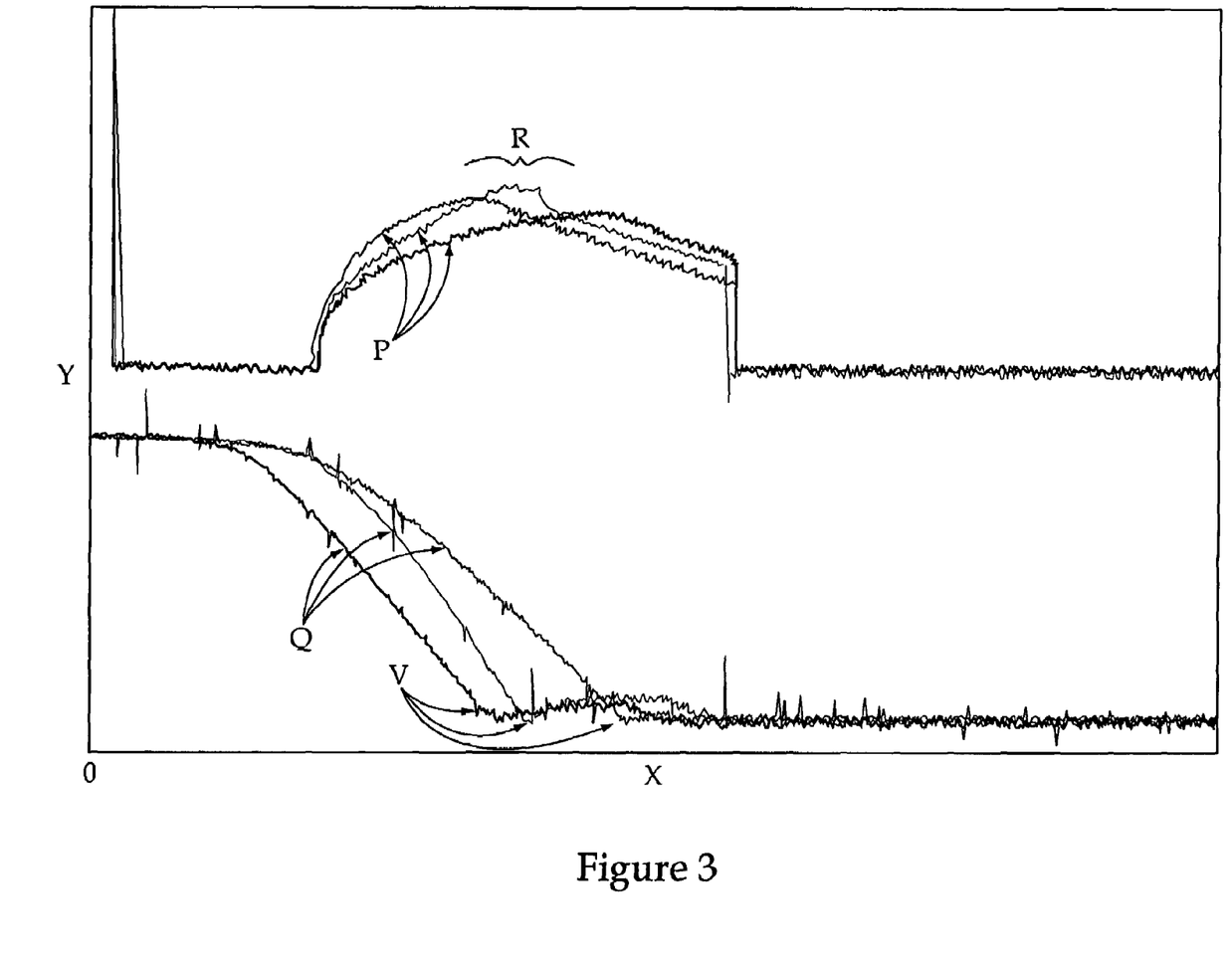
FIG. 3 is a graph illustrating induced currents in an actuator control circuit relative to control valve pin position, according to the present disclosure.

Knowing the timing of cessation of control current in control circuits 52 allows relative pulse peak timing to be determined. Referring to FIG. 3, there is shown a graph illustrating several current pulses, P, in a control circuit 52 characterized by induced current pulse peaks approximately in a range, R. Also shown are several plotted lines, Q, indicative of valve pin position, e.g. valve pin 65. In the FIG. 3 graph, the X-axis represents time, whereas the Y-axis represents signal values corresponding to current level regarding current pulses P and valve position regarding lines Q. Together, lines Q and P represent several trials wherein valve pin position was measured as it relates to induced current pulse peak timing. It will be noted that valve pin position reaches a minimum value, approximately at points V, when current pulses P are within range R. The minimum values at points V correspond generally to points in time at which valve pin 65 reaches seat 69, having maximum velocity and consequently inducing maximum current in control circuit 52.

Control current ceases in control circuit 52 at approximately time=0 in the FIG. 3 graph. Thus, a difference between the timing of ceasing control current in circuit 52 and the pulse peaks within range R can be recorded for each of valve apparatuses 18 in engine system 18. The pulse peak timing values for all cylinders may further be averaged to give a nominal timing value for engine system 11. Deviations from nominal may thus be used to determine that a problem with a particular cylinder exists. In one embodiment, the dwell time for control currents for one or more actuators 20 can be adjusted to trim each valve apparatus 18 and associated cylinder toward a more nominal value, such that the timing of end of motion for each control valve member 64 is as close as practicable in each valve apparatus 18 to nominal for engine system 11. In other words, the duration of control current can be shortened or lengthened to result in pulse peaks relatively closer in relative timing to an average pulse peak for induced currents. This approach represents one manner in which cylinders/valves of engine system 11 may be trimmed, and takes advantage of the relationship between a timing of each control valve 64 reaching an end of motion, and the timing of closing of the associated intake valve member 22 to trim all cylinders of the engine toward operation which is as consistent as practicable.

Electronic control module 40 and/or service tool 42 may be used in detecting and logging/recording a pulse peak timing and the presence or absence of induced current pulses in each control circuit 52. Thus, during normal operation or during a diagnostic process, electronic control module 40 and/or service tool 42 may indicate a performance condition, e.g. presence or absence of problems via outputting signals corresponding to valve performance of each of valve apparatuses 18. A fault or failure associated with a particular valve apparatus 18 and cylinder 14 may be recognized by a technician or computer, and corrective action may then be taken, replacing an inoperative component or trimming a specific cylinder towards more nominal operation. Control module 40, or service tool 42, may include a computer readable medium such as RAM or ROM having a control algorithm recorded thereon for performing the diagnostic and trimming routines described herein.

INDUSTRIAL APPLICABILITY

Figure 4:
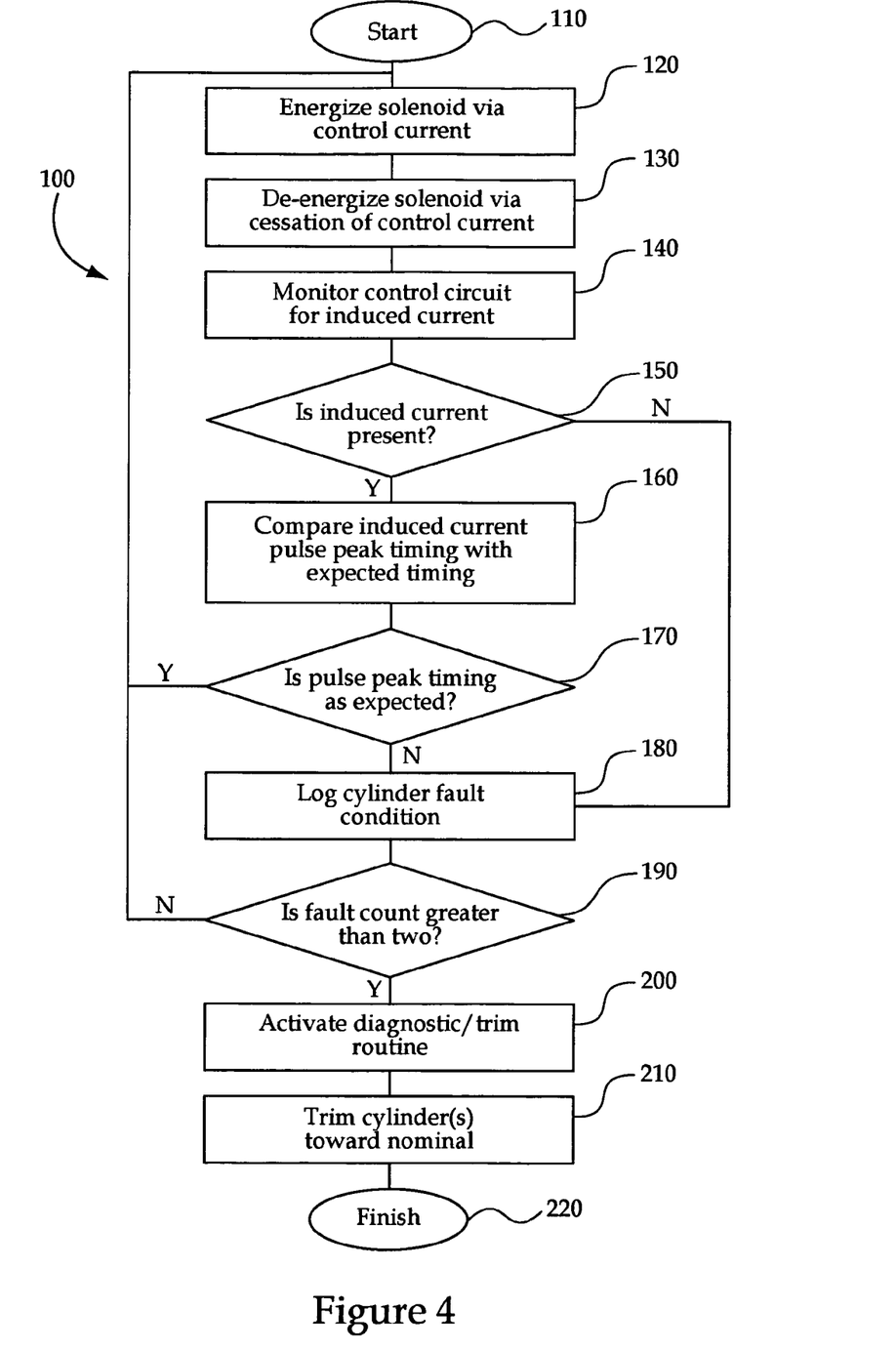
FIG. 4 is a flowchart illustrating a control process according to the present disclosure.

Referring also to FIG. 4, there is shown a control process 100 via a flow chart, in accordance with the present disclosure. Process 100 illustrates certain steps appropriate for holding open one of intake valve apparatuses 18 during a portion of a piston compression stroke during an engine cycle in engine system 11. In different engine system or valve configurations, a different process may be used without departing from the scope of the present disclosure. Process 100 may commence with a Start or initialize step 110, and then may proceed to step 120 wherein electronic control module 40 may command energizing of solenoid 66 via generation of a control current. Energizing solenoid 66 will tend to move valve member 66 from a biased position at which fluid can drain through passage 60 toward a second position, against seat 68 at which fluid is blocked from draining via passage 60. Thus, if operating properly, energizing solenoid 66 will result in hydraulically locking piston 56 in a position at which it holds valve member 22 in an open position.

From step 120, process 100 may proceed to step 130 wherein electronic control module 40 may command de-energizing solenoid 66 via cessation of the control current. If electrical actuator 20 is operative, de-energizing solenoid 66 will allow spring 70 to begin to return valve member 64 toward seat 69, and open fluid passage 60. From step 130, process 100 may proceed to step 140 wherein electro-motive sensor 41 may be used to monitor control circuit 52 for an induced current. From step 140, process 100 may proceed to step 150 wherein electronic control module 40 may determine whether an induced current is present. If no induced current is detected, e.g. where valve member 64 is stuck, or some other failure has occurred such that valve member 64 does not induce a current in circuit 52, process 100 may proceed ahead to step 180 wherein electronic control module 40 can log a cylinder fault condition specific to the particular cylinder/valve being monitored.

If at step 150, the induced current is present, process 100 may proceed to step 160 wherein electronic control module 40 may compare the induced current pulse peak timing with an expected timing, such as that defined by an average induced current pulse peak timing for each of actuators 20 of engine system 11, measured from the point in time at which the control current for a given electrical actuator 20 ceases. From step 160, process 100 may proceed to step 170 wherein electronic control module 40 may query whether pulse peak timing is as expected. If no, process 100 may proceed ahead to step 180 to log a cylinder fault condition specific to the cylinder being monitored. If pulse peak timing is as expected at step 170, process 100 may return to step 120 and proceed in monitoring one or more cylinders again, or might simply exit.

From step 180, process 100 may proceed to step 190 wherein electronic control module 40 may query whether the fault count is greater than a predetermined number, for example 2. If the fault count is greater than 2 in step 190, process 100 may proceed to step 200 to activate a diagnostic/trim routine, wherein the subject cylinder(s) associated with more than 2 faults can be trimmed towards nominal operation in step 210. From step 210, process 100 may proceed to step 220 to Finish. If at step 190, the fault count is not greater than 2, process 100 may loop through the routine again, each time evaluating cylinder performance and determining whether any cylinder needs to be trimmed toward nominal.

The present disclosure provides a diagnostic strategy for variably timed engine valves providing advantages over many known systems and processes. In particular, the strategy described herein wherein back EMF is monitored to determine control valve timing characteristics facilitates a diagnostic around an individual component of a variable valve system. Rather than simply indicating that something in the system is wrong, as in certain earlier strategies, the present disclosure will provide for identification of a specific component that is malfunctioning, or functioning in a sub-optimal manner. This approach promises to reduce system downtime previously required to track down specific components that are the source of a problem. The recognition of the potential for identifying faults via monitoring induced currents in a sub-component of a variably timed valve system enables these improvements over earlier designs. Moreover, while indicating problems in a variable valve system, as described herein, as well as its source is contemplated to improve engine system maintenance issues, the present disclosure further provides a means for ameliorating certain variable valve operating problems, is more robust than earlier designs, and can identify specific failure modes for a given cylinder, or the overall system. Variations in intake valve closing timing, for example, may be addressed with an easily implemented means of trimming individual cylinders towards more nominal operation, based on the same signal(s) generated in evaluating a given valve's performance.

In a related aspect, the present disclosure provides a means for evaluating and trimming valve performance which is applicable to valves other than intake and exhaust valves. Essentially any valve whose position is controlled via an electrical actuator may be amenable to performance evaluation and modification via the presently disclosed strategy, so long as an induced electrical current exists which can be detected upon the valve occupying, reaching or traveling past some ascertainable location. In other words, an induced current separate from an actuator control current may be detected and leveraged to adjust valve operation, and an associated engine function, toward a desired, e.g. nominal, state.

Application of the present strategy to evaluate and modify performance of various engine valves offers the added advantage of using only one signal, e.g. corresponding to an induced current, to both detect and address deviations in valve performance from a desired performance. The use of the same signal will provide for an elegant, simple means of improving overall engine performance. Thus, those skilled in the art will appreciate that a wide variety of engine valves, including hydraulic valves for controlling supplying or evacuation of fluid in a variety of different engine systems, might advantageously be operated, evaluated and trimmed according to the teachings set forth herein.

The present description is for illustrative purposes only, and should not be construed to narrow the breadth of the present disclosure in any way. Thus, those skilled in the art will appreciate that various modifications might be made to the presently disclosed embodiment without departing from the spirit and scope of the present disclosure. For instance, while it is contemplated that intake and exhaust valves in engine systems according to the present disclosure will typically be partially cam operated, with electronically controlled valves providing for timing variation, the present disclosure is not thereby limited. For instance, engine system 11 might comprise a camless engine wherein, rather than using a cam to urge valve members 22 to open positions, an electrohydraulic actuator is used to urge valve members 22 to open positions via hydraulic pressure, and permits returning of valve members 22 to closed positions via selectively relieving hydraulic pressure. Other aspects, features and advantages will be apparent upon an examination of the attached drawings and appended claims.

What is claimed is:

1. A method for operating a multi-cylinder internal combustion engine comprising the steps of:
   controlling opening or closing of one of intake and exhaust valves associated with each of the cylinders using an actuation fluid pressure, including a step of generating a control current in an actuator control circuit for an electrical actuator operable coupled with one of the valves, wherein the electrical actuator is configured to control the actuation fluid pressure,
   monitoring the actuator control circuit for an induced current via electromagnetic interactions between components of the electrical actuator different from the control current; and
   outputting a signal indicative of a valve performance responsive to monitoring the actuator control circuit.

2. The method of claim 1 wherein the controlling step comprises varying a closing time of intake valves of the engine, and wherein the generating step comprises commanding energizing the electrical actuator to delay closing of an intake valve coupled therewith.

3. The method of claim 2 further comprising a step of moving intake valves of the engine to open positions at least in part by rotating an engine cam, wherein the controlling step further comprises holding open each of the intake valves during a portion of a piston compression stroke in corresponding cylinders.

4. The method of claim 3 wherein:
   the components of the electrical actuator comprise a solenoid and an armature coupled with a control valve configured to control the actuation fluid pressure acting on a control surface of an intake valve actuator; and
   monitoring the actuator control circuit comprises monitoring the actuator control circuit for induced current via electromagnetic interaction between the solenoid and a portion of the control valve.

5. The method of claim 4 further comprising a step of comparing current values from the monitoring step with expected current values, wherein the step of outputting a signal indicative of valve performance further comprises outputting a signal responsive to comparing the current values.

6. The method of claim 5 wherein the generating step comprises generating a control current in each of a plurality of actuator control circuits for a plurality of electrical actuators each coupled with one of the intake valves of the engine, the method further comprising a step of indicating a fault condition specific to one of the intake valves where an outputted signal associated with the one of the intake valves satisfies fault criteria.

7. The method of claim 4 wherein the monitoring step comprises monitoring a plurality of actuator control circuits for a plurality of electrical actuators each associated with one of the intake valves of the engine, and wherein the step of outputting a signal comprises outputting signals indicative of valve performance for each of the intake valves, the method further comprising the steps of:
   recording outputted signal values in an electronically accessible storage medium; and
   trimming at least one of the cylinders responsive to the recorded values, including adjusting the control current in at least one of the plurality of actuator control circuits.

8. The method of claim 7 wherein the monitoring step further comprises a step of determining a timing of a pulse peak of an induced current in each of the actuator control circuits that corresponds to end of motion of a control valve associated therewith, and wherein the trimming step comprises trimming at least one of the cylinders responsive to the determined timing of the pulse peak in the corresponding actuator control circuit.

9. A method for operating a variable valve in an internal combustion engine comprising one of an intake and an exhaust valve, the method comprising the steps of:
   generating a control current in an actuator control circuit for an electrical actuator configured to maintain the variable valve in an open position by blocking a fluid drain passage;
   commanding cessation of the control current;
   monitoring an induced current in the actuator control circuit subsequent to commanding cessation of the control current; and indicating a performance condition of the valve responsive to monitoring current in the actuator control circuit.

10. The method of claim 9 wherein the valve comprises an intake valve, the method further comprising a step of maintaining the intake valve in the open position during a portion of a piston compression stroke in a cylinder associated with the intake valve.

11. The method of claim 10 wherein the monitoring step further comprises determining whether an induced current is present in the actuator control circuit, the method further comprising a step of indicating a fault condition of the intake valve if an induced current is absent.

12. The method of claim 10 wherein the step of maintaining the valve in the open position includes blocking the fluid drain passage for a hydraulic valve actuator via a control valve configured to move responsive to energizing the electrical actuator via the control current.

13. The method of claim 12 further including permitting moving the control valve via the step of commanding cessation of the control current.

14. The method of claim 13 wherein the monitoring step further comprises a step of determining a timing of a pulse peak of the induced current.

15. The method of claim 14 further comprising a step of trimming the cylinder associated with the intake valve responsive to the determined timing of the pulse peak of the induced current.

16. An internal combustion engine comprising:
an engine housing having a plurality of cylinders;
intake valves in fluid communication with each of the cylinders;
exhaust valves in fluid communication with each of the cylinders;
electrical actuators configured to control opening or closing of one of said intake valves and said exhaust valves at least in part via energizing and de-energizing of the electrical actuators, said electrical actuators each coupled with a actuator control circuit; and
an electronic control module configured to determine a performance condition of each of the valves via monitoring each of the actuator control circuits for induced currents when the corresponding electrical actuators are de-energized
an engine cam configured to open each of the intake valves via rotating;
hydraulic intake valve actuators each associated with one of the intake valves and configured to selectively maintain the intake valves in open positions; and
fluid drain passages each associated with one of the intake valve actuators;
wherein the electrical actuators are each configured to control the intake valve actuators via controlling blocking and unblocking of the corresponding fluid drain passage.

17. The engine of claim 16 wherein said electronic control module is configured via a fault detection routine to determine a fault condition of said intake valves, based on comparing monitored current in each of said actuator control circuits with expected current, and further configured to adjust the closing timing of corresponding intake valves responsive to determined fault conditions.

18. The engine of claim 17 wherein said electronic control module is configured via said fault detection routine to determine fault conditions of said intake valves, based on comparing induced current pulse peak timing with an expected timing.

* * * * *

UNITED STATES PATENT AND TRADEMARK OFFICE
CERTIFICATE OF CORRECTION

PATENT NO. : 7,634,981 B2　　　　　　　　　　　　　　　　　　　　　　　　　　Page 1 of 1
APPLICATION NO. : 11/639685
DATED : December 22, 2009
INVENTOR(S) : Dea et al.

It is certified that error appears in the above-identified patent and that said Letters Patent is hereby corrected as shown below:

Please correct the Title as follows:
Title Page, item (54), in Column 1, Line 1, delete "PERFORMING" and insert -- PERFORMANCE --.

Please correct the Specification as follows:
Column 1, line 1, delete "PERFORMING" and insert -- PERFORMANCE --.

Signed and Sealed this

Fifteenth Day of June, 2010

David J. Kappos
*Director of the United States Patent and Trademark Office*